June 24, 1941.  S. V. BEAUNE  2,246,872
METHOD AND APPARATUS FOR MANUFACTURING THIN GELATINOUS COATINGS
Original Filed Sept. 23, 1935
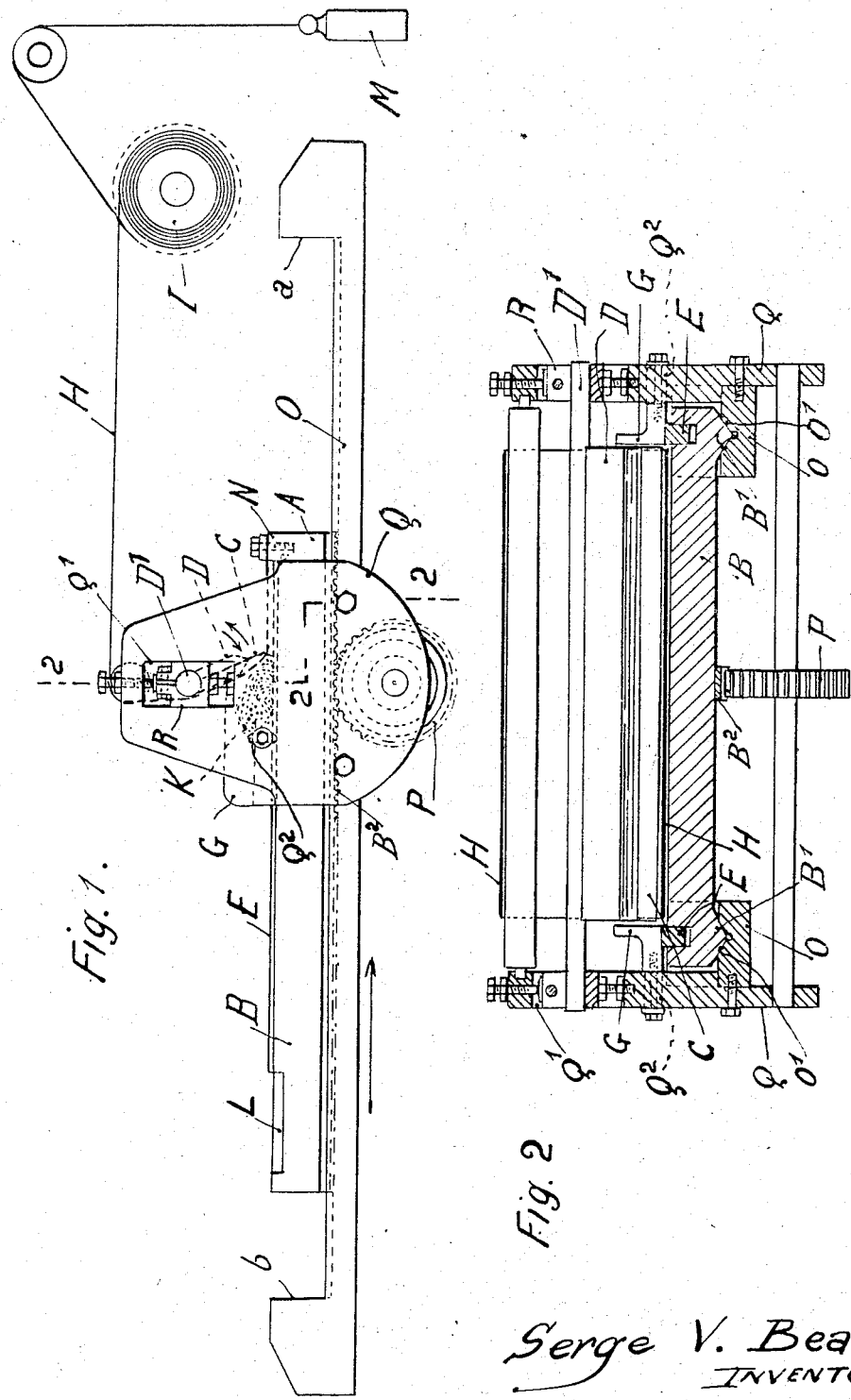
Serge V. Beaune
INVENTOR
by Glascock Downing & Seebold
ATTYS.

Patented June 24, 1941

2,246,872

UNITED STATES PATENT OFFICE 2,246,872

METHOD AND APPARATUS FOR MANUFACTURING THIN GELATINOUS COATINGS

Serge Virgile Beaune, Creteil, France, assignor to Société des Procédés Serge Beaune, Creteil, Seine, France Original application September 23, 1935, Serial No. 41,800. Divided and this application February 25, 1937, Serial No. 127,784.

4 Claims. (Cl. 91—18)

The present invention relates to apparatus and a method of manufacturing relatively thin bands particularly for use in printing operations.

In the United States Patent No. 2,143,617 of which the present application is a division, there is described a removable coating for rolls, plates and coveyor tracks for printing purposes and other similar applications and constituted by a band of plastic material the main ingredient of which is gelatine, of relatively reduced thickness, laid on to a carrier on which said band of plastic material adheres.

This invention relates to a method for the manufacture of the above coating and to apparatus for carrying said method into practice.

The method for the manufacture of a composite band is characterised by the feature that a certain quantity of the plastic material constituting the composite band is deposited upon a movable element which is flat or otherwise, above which is situated at a short well defined distance, an equalising plate which compresses the material between the movable elements and the band of fabric forming the support, the band of fabric being driven under tension by the displacement of the movable element itself.

This method of manufacture is carried out by means of the machine illustrated diagrammatically in longitudinal section in the accompanying drawing.

In the drawing:

Fig. 1 is a side elevational view of apparatus for forming the composite band.

Fig. 2 is a transverse sectional view taken on the line 2—2 of Fig. 1.

The movable element is formed by a steel slab AB, preferably ground, polished and chromium-plated upon its upper surface. This slab AB is provided on the lower face thereof with two longitudinally extending ribs $B^1$. The ribs engage channels or grooves $O^1$ formed in the upper part of fixed guide rails O. The slab AB is thus supported and may be moved longitudinally on the guide rails O by means of a driving pinion P which engages the teeth of a rack gear $B^2$ secured to the slab.

The guide rails O also carry two vertical members Q each having an upper part $Q^1$.

A tempered steel blade C having a thickness of approximately 0.5 millimeter is secured in a blade holder D. The blade holder is adapted to be pivoted and is mounted on a shaft $D'$ supported at the ends thereof in two gripping members R. The gripping members R are slidably arranged in openings provided in the upper parts $Q^1$ of the vertical members Q. The blade C may be maintained in any desired position by adjusting the angular position of the shaft $D^1$ in the gripping members R. The blade C is of sufficient length to extend across the entire width of the slab AB and the blade is preferably ground on both sides.

Upon each of the lateral edges of the slab is fixed a rod E, the thickness of which will advantageously be 2 millimeters if it is desired to manufacture coating sleeves or sheaths for rollers or other inking members and 0.5 millimeter for wiping sleeves and sheaths and rollers.

The material K, which constitutes the body of the coating is deposited upon the slab and it is held laterally by side plates G. The side plates G are carried by the fixed vertical members Q and secured thereto by means of bolts $Q^2$.

At the rear end B of the slab AB is formed a container L which receives the unused material at the end of the travel.

The supporting fabric H is wound upon a drum I, and is held under tension by a counterweight M. The free end of the fabric H is secured to the front part A of the slab and it is held there for example by means of a clip N, the face of the fabric H to be coated being turned towards the polished slab.

The blade C, by an angular displacement of suitable amplitude about the axis $D'$ is adjusted and fixed in the required position in order to compress the fabric H upon the rods E. The distance from the edge of this blade to the slab corresponds to the thickness of the body of the sheath it is desired to obtain, account being taken of the thickness of the supporting fabric.

After having placed the side plates G in the desired position, a sufficient quantity of a material having a pasty consistency and raised to a suitable softening temperature, is poured upon the slab AB, this material being then engaged by its mass between the slab and the fabric. The slab is then made to move forward at a speed which is preferably uniform, for example at 100 millimeters per second.

Under these conditions the material which is compressed by the blade C between the slab and the fabric H, spreads in a uniform layer over the whole width of the latter.

The front end of the slab at the end of travel stops against an abutment $a$ while the unused material finally spreads into the container L.

The fabric which has thus received its first layer is allowed to cool. In order to repeat this operation, and in order to deposit if required a second additional coat which is intended to complete the thickness reduced by shrinkage due to cooling, it is sufficient to raise the blade C, for example into a position parallel to the slab and to return the latter backwards as far as the stop b.

The layer of material which has just been deposited adheres to the fabric and becomes detached from the polished slab. In order to deposit the second layer, the first operation is repeated under the same conditions.

After cooling, the coated fabric is cut at B, and detached at N. The coated surface finally obtained is bright, polished and free from all blow holes and traces of air bubbles.

For the manufacture of wiper coatings, the fabric will have received before the coating operation is carried out, a layer which renders it impervious by the usual means. The fabric will naturally be coated upon the surface of the latter which has not been rendered impervious.

What I claim as my invention and desire to secure by Letters Patent is:

1. A method of manufacturing a thin, gelatinous removable coating, having a thickness of not more than 2.5 millimeters for use in printing apparatus, which comprises depositing a quantity of plastic gelatinous material on a smooth rigid surface, arranging fabric sheet material over the gelatinous material and thereafter spreading the gelatinous material in a thin layer of uniform thickness over the smooth rigid surface and simultaneously maintaining one face of the fabric into adhering engagement with the material being spread.

2. A method of manufacturing a thin, gelatinous removable coating, having a thickness of not more than 2.5 millimeters for use in printing apparatus, which comprises depositing a quantity of plastic gelatinous material on a smooth rigid surface, arranging fabric sheet material over the gelatinous material and thereafter spreading the gelatinous material in a thin layer over the smooth rigid surface by continuous movement of the fabric relative to a knife edge applied to one face of the fabric to simultaneously spread the gelatinous material and to cause the fabric to adhere to the material being spread.

3. A machine for carrying out the process described comprising a rigid metal slab having a polished upper surface, a relatively thin blade arranged above said slab and having the lower end thereof extending across the slab in a uniform spaced relation with respect to the upper surface of the slab, means for guiding a web of sheet material under the lower edge of said blade, means for securing one end of the web to said slab, and means for supporting said slab for sliding movement relative to said blade.

4. A machine for carrying out the process described comprising a rigid movable metal slab having a polished chromium plated upper surface, a blade arranged above said slab and having the lower end thereof extending across said slab in a uniform angular spaced relation with respect to the upper surface of the slab, means for guiding a fabric web under the lower edge of said blade, means for attaching the end of the web to said slab, means for tensioning the web passing over said guiding means, and means for supporting said slab for sliding movement relative to said blade.

SERGE VIRGILE BEAUNE.